United States Patent [19]
Plocher et al.

[11] Patent Number: 5,941,491
[45] Date of Patent: Aug. 24, 1999

[54] HOLDING DEVICE FOR DRINKS CONTAINERS

[75] Inventors: Bernd Plocher, Rottenburg-Seebronn; Martin Kruse, Sindelfingen; Michael Sinner, Rottenburg-Seebronn, all of Germany

[73] Assignee: Fischerwerke, Artur Fischer GmbH & Co. KG, Waldachtal, Germany

[21] Appl. No.: 08/927,758

[22] Filed: Sep. 11, 1997

[30] Foreign Application Priority Data

Sep. 11, 1996 [DE] Germany .............. 196 36 825

[51] Int. Cl.⁶ ...................................... A47K 1/08
[52] U.S. Cl. ................... 248/311.2; 297/188.17; 224/926
[58] Field of Search ............... 248/311.2; 297/188.17; 312/309; 224/281, 926

[56] References Cited

U.S. PATENT DOCUMENTS 5,259,580  11/1993  Anderson et al. ............... 248/311.2

FOREIGN PATENT DOCUMENTS

| 44 23 097 A1 | 1/1995 | Germany . |
| 6-115391 | 4/1994 | Japan . |
| 6-211079 | 8/1994 | Japan . |
| 6-219202 | 8/1994 | Japan . |

Primary Examiner—Ramon O. Ramirez
Attorney, Agent, or Firm—Michael J. Striker

[57] ABSTRACT

A holding device for drink containers to be arranged in a central console of a car in front of a gear-changing or gear-selecting lever, has a holder having a linear guide and extendable from a pushed-in basic position into an extended holding position, the holder having a receptacle for insertion of a drink container, the linear guide being formed so that it causes a swivelling movement of the holder to a side during an extending movement of the holder from the pushed-in basic position to the extended holding position.

8 Claims, 3 Drawing Sheets

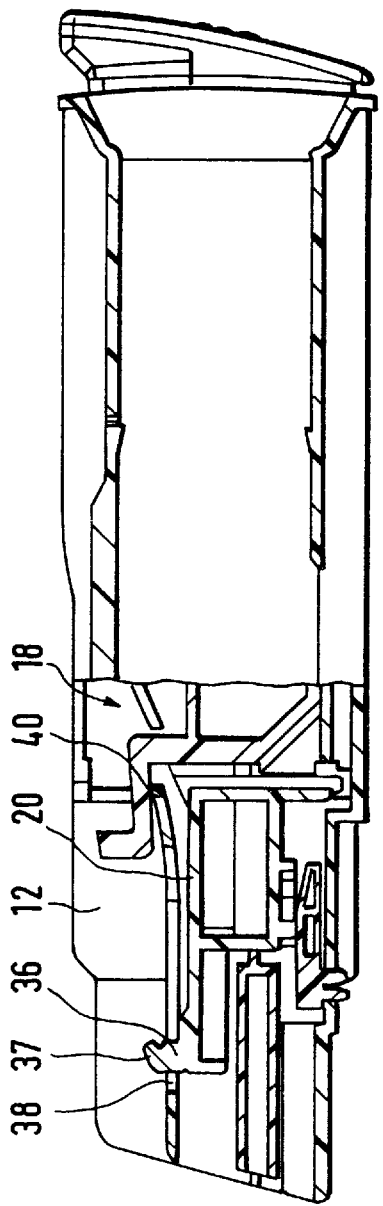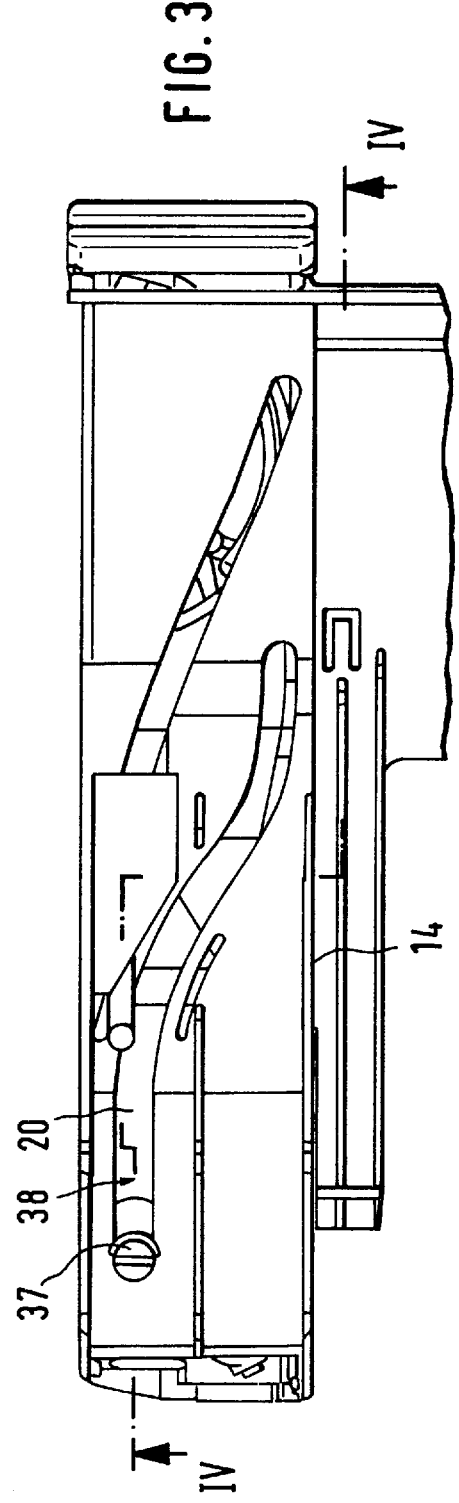

HOLDING DEVICE FOR DRINKS CONTAINERS

BACKGROUND OF THE INVENTION

The present invention relates to a holding device for a drink container, which holding device is provided for arrangement in a central console of a car in front of a gear-changing or gear-selecting lever.

Holding devices which are provided for mounting in a dashboard of a car are known. These holding devices have a holder that is guided in the dashboard in the manner of a drawer and that can be extended into a holding position, in which the holder projects outwards from the dashboard into a passenger space of a car. As a result, a receptacle in the holder becomes freely accessible, which receptacle is provided for the insertion of a drink container. When the holder is not required, it can be pushed into a basic position, in which the holder shuts away flush with the dashboard facing the passenger space.

If such a holding device is to be arranged relatively low down, that is to say at the level of a gear-changing lever (manual gearbox) or gear-selecting lever (automatic gearbox), then, depending on the distance of the gear-changing or gear-selecting lever from the central console, the gear-changing or gear-selecting lever, when it is moved forwards towards the central console, may collide with the holder, when the holder is in its extended holding position. The known holding devices therefore have the disadvantage that they can be accommodated in a central console of a car only if they are positioned at a level above the gear-changing or gear-selecting lever or if the distance between the gear-changing or gear-selecting lever and the central console is sufficiently large.

SUMMARY OF THE INVENTION

Accordingly, it is an object of the present invention to provide a holding device for drink containers, which avoids the disadvantages of the prior art.

More particularly, it is an object of present invention to provide a holding device for drink containers, which is formed so that in the extended holding position and during extension, its holder does not come into contact with the gear-changing or gear-selecting lever when a gear is being changed.

In keeping with these objects and with others which will become apparent hereinafter, one feature of present invention resides, briefly stated, in a holding device for drink containers, in which during extension, the linear guide of the holding device also guides the holder thereof to the side at the same time, preferably in an arcuate movement. In its extended holding position, therefore, the holder projects outwards from the central console obliquely to one side, preferably to the passenger side. The holder has been swivelled through an angle about an imaginary vertical axis with respect to its pushed-in basic position. In the basic position, the holder is aligned approximately in the longitudinal direction of the car, that is to say parallel to lateral surfaces of its mounting space, so that it does not occupy more room in the mounting space than is necessary. The lateral movement of the holder is selected to be so large that the gear-changing or gear-selecting lever does not come into contact with the holder in any position and so small that legroom of the passenger or of a driver is restricted as little as possible.

Since a front surface of the central console is usually at a slant and the mounting space, as a result, is inclined with respect to a horizontal plane, the linear guide of the holding device according ton one embodiment of the invention guides the holder out of the basic position firstly in an ascending direction corresponding to the inclination of the mounting space, that is to say ascending, into a horizontal direction on reaching the holding position. The holder is therefore swivelled, in addition to its lateral movement, from an attitude running obliquely upwards in the basic position, into a horizontal attitude in the holding position and, as a result, is swivelled downwards. By that means a drink container inserted into the receptacle of the holder, for example a drink can, a cup or a breaker, is held in a vertical attitude.

In one embodiment of the invention, the guide is constructed in the form of a three-point guide, for example on two longitudinal edges located diagonally opposite each other and on a rear end of the extensible holder. The two guides ont he longitudinal edges of the holder can be straight guides.

In another embodiment of the invention there is provided as the guide on the rear end of the holder, which guide, during extension, swivels the holder to the side and downwards into the horizontal, a stationary guide track, which, at least for a portion of its length, runs at an angle to the longitudinal direction of the holder in the holder's basic position and into which a guide element of the holder engages. The angle of the quick track with respect to the longitudinal direction of the holder can change over the length of the guide track. The guide track therefore runs obliquely to the direction of extension of the holder and, as a result, during extension moves the rear end of the holder, which rear end is guided in the guide track, to the side. As a result, the holder is swivelled to the side. As the guide track also runs in an ascending manner in the direction of extension, the holder is swivelled out, during extension, from its upward-facing basic position into a horizontal attitude in the holding position.

In still another embodiment of the invention, the guide track can also be provided on the holder instead of being stationary; the guide element engaging int he guide track is then arranged to be stationary.

Preferably, the holder is extended into the holding position by a spring element; and pushed back into the basic position against the force of the spring element. A locking device, for example by means of a heart cam known per se, holds the holder in its basic position against the force of the spring element. By pressing against a front face of the holder in the basic position, the holder is unlocked.

In order to keep the mounting space occupied by the holding device according to the invention small, the holder is preferably made narrower than the diameter of a drink container that is intended for insertion into the receptacle of the holder. The holder therefore grips only part way around an inserted drink container. In order for a drink container nevertheless to be held securely, there is provided in a practical form of the invention a holding arm that is so arranged on the holder that it can be moved outwards, for example swivelled, to the side. During extension of the holder, that holding arm moves, for example by spring actuation, outwards from the holder to the side and completes the receptacle of the holder for the insertion of a drink container. The holder and, as a result, also the whole holding device can, in that practical form of the invention, be constructed half as wide as the diameter of a drink container to be inserted in the receptacle or slightly wider.

Preferably, the holding arm moves outwards from the holder to the same side as that to which the holder swivels during extension, in order not to reduce the clear space for the gear-changing or gear-selecting lever gained by means of the sideways movement of the holder during extension.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 shows, in plain view, the holding device from FIG. 1 in the region of a guide track; and FIG. 4 shows a section along the guide track according to line IV—IV in FIG. 3.

DESCRIPTION OF PREFERRED EMBODIMENTS

Figure 1:
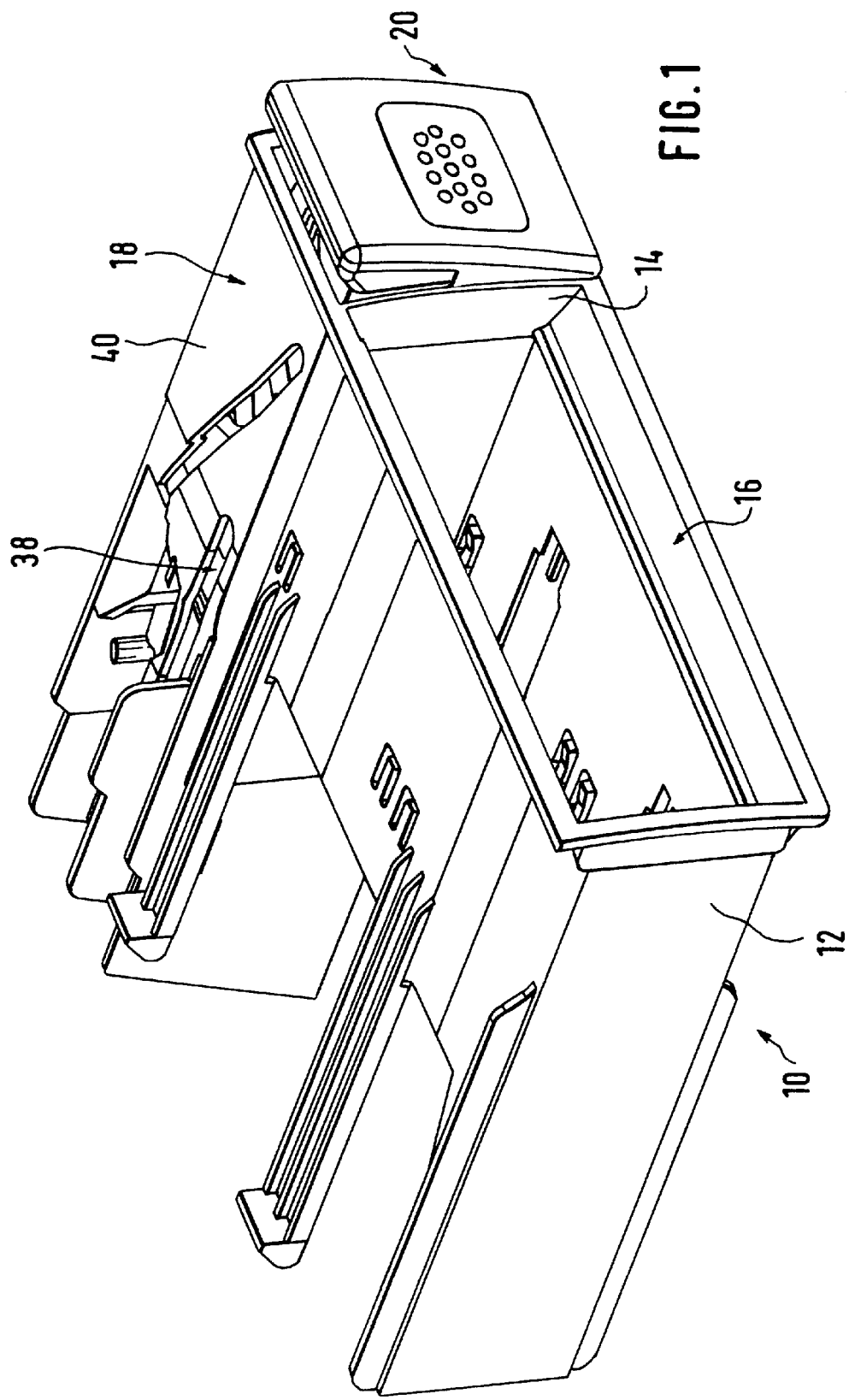
FIG. 1 shows, in a perspective representation, a holding device according to the invention in its basic position.
Figure 2:
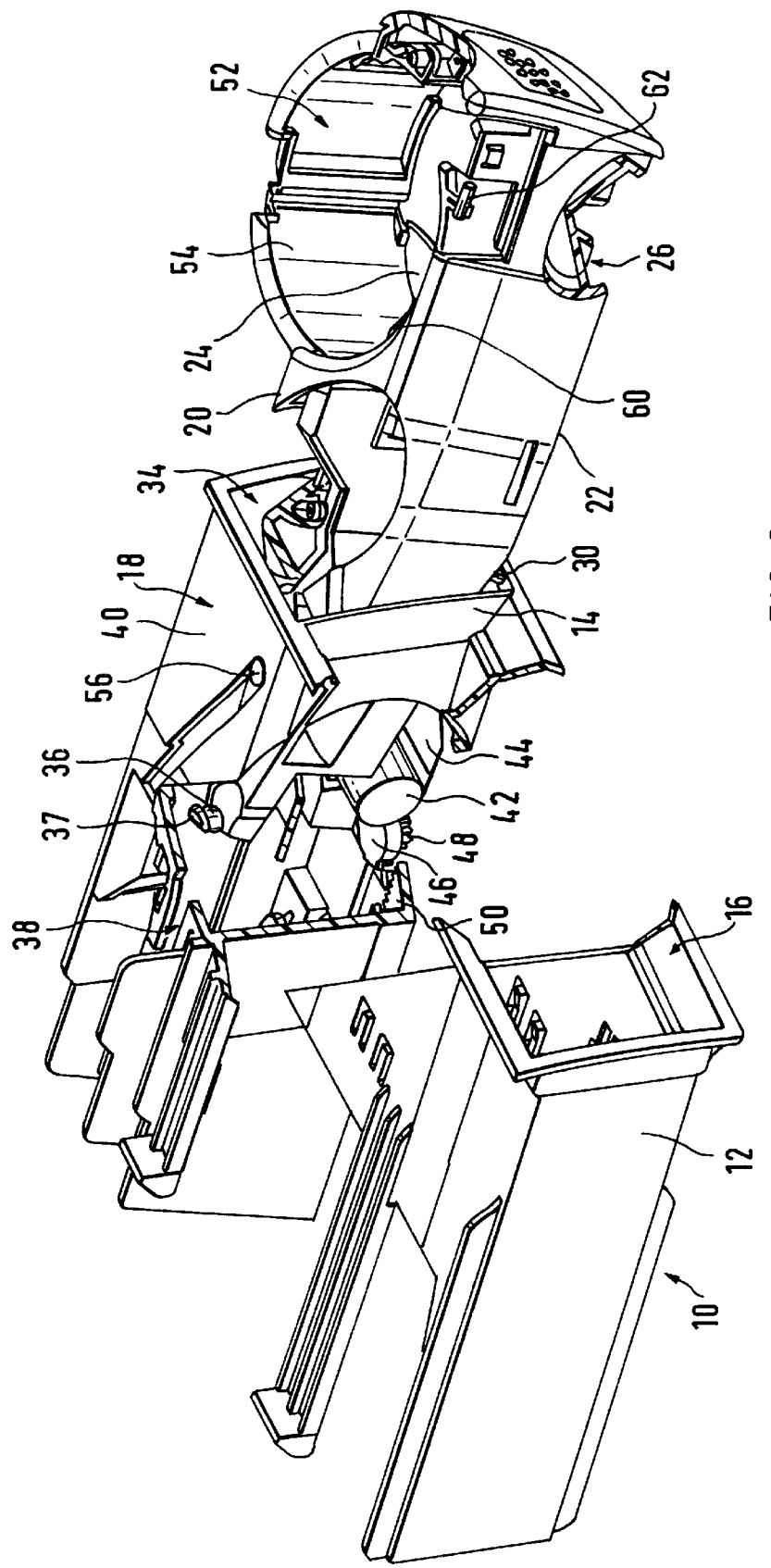
FIG. 2 shows, partly broken away, the holding device according to FIG. 1 in its holding position.

A holding device 10 according to the invention shown in FIGS. 1 and 2 for a drink container (not shown), such as, for example, a drink can, a breaker or a cup, has a housing 12 made from injection-molded plastics. It is provided for mounting in a central console of a car (not shown) below a car radio. It is accordingly located at the level of a gear-changing or gear-selecting lever and in front thereof. The housing 12 is intended for installation in a standardized mounting space for a car radio.

The housing 12 is divided by a partition wall 14 into a storage compartment 16, which occupies approximately ¾ of the width of the housing 12, and a mounting space 18 for a holder 20, which occupies approximately ¼ of the width of the housing 12.

The holder 20 is an elongate part of injection-molded plastics that is almost as long as the housing 12 is deep and that is of rectangular, almost square cross-section. The holder 20 can be extended in the manner of a drawer from a basic position, in which it has been pushed completely into the housing 12 and shuts away flush with the housing 12 as shown in FIG. 1, into a holding position, in which it projects outwards from the housing 12 as shown in FIG. 2. In the embodiment, the holder 20 is passenger side in the housing 12.

The holder 20 has a three-point linear guide for the purpose of extension. The holder 20 has two straight guides in the region of its lower longitudinal edges 22 of which only a left-hand one is shown in the drawing (FIG. 2). Those straight guides are formed by straight longitudinal grooves 26, which are molded into an underside and a right-hand side of the holder 20 near the lower longitudinal edges 22, 24. Into each of those two longitudinal grooves 26 there engages a pin 30, which is integral with the housing 12 and is located near an opening 34 of the housing 12, out of which opening 34 the holder 20 can be extended.

The holder 20 has, as the third guide point, an upward-pointing pin 36 having a head 37 that reaches through a slot 38 located in an upper wall 40 of the housing 10. The head 37 of the pin 36 is located above the slot 38 and has a diameter larger than the width of the slot 38. The slot 38 forms a third guide track of the linear guide of the holder 20 (FIGS. 3 and 4). The slot 38 runs from a back end of the housing 12 approximately to the front third thereof and it runs in a S-shape first straight along a right-hand side of the housing 12, then crosses the width of the mounting space 18 for the holder 20 in a curved course and terminates in a straight course along the partition wall 14. The S-shaped course of the slot 38 across the width of the mounting space 18 of the holder 20 causes the rear end of the holder 20, on which the guide pin 36 engaging in the slot 38 is located, to swivel to the left when the holder 20 is extended from the basic into the holding position, so that a front region of the holder 20, which projects outwards from the housing 12 in the holding position, swivels to the right and, accordingly, towards the passenger side when the holder 20 extends outwards from the housing 12.

The upper wall 40 of the housing 12, in which upper wall 40 the slots 38 is arranged, rises in the longitudinal direction of the slot 38 from the back to the front, so that the rear end of the holder 20, on which the guide pin 36 of the holder 20 engaging in the slot 38 is located, moves upwards when the holder 20 is extended. As a result, the part of the holder 20 projecting outwards from the housing 12 in the holding position swivels downwards. The reason for that is that the mounting space for the holding device 10 in the central console of a car is usually inclined with respect to a horizontal plane (for example, by approximately 15°). As a result of the swivelling downwards, the holder 20 reaches a horizontal plane when extended. A rear portion of the holder 20, which in the holding position remains in the housing 12, is of tapered construction so that there is clear space for the purpose of swivelling the holder 20 in its mounting space 18 in the housing 12.

At the rear end of the holder 20 a coil 42 of a scroll spring is accommodated so as to be unrollable, the free end 44 of which scroll spring is arranged on the housing 12. The scroll spring 42 is a tension spring, which extends the holder 20 into the holding position. The extending movement is damped by means of a fluid rotary damping element 46, which is arranged on the underside of the holder 20 and the toothed wheel 48 of which meshes with a toothed rack 50 of the housing 12. A hear cam locking device, which is not shown in the drawing and is known per se, holds the holder 20 in its basic position pushed into the housing 12 against the force of the scroll spring 42.

In its front region, the holder 20 has an approximately semi-cylindrical insertion opening as the receptacle 52 for a drink container to be inserted. The semi-cylinder forming the receptacle 52 is open to the right-hand side and, accordingly, to the passenger side of the holder 20, to which side the holder 20 swivels during extension. The receptacle 52 is completed to form a full cylinder by means of a holding arm 54, which in its front region is constructed in a semi-circular shape. The holding arm 54 has two swivel pins 56 at its back end, which are mounted top and bottom in the holder 20. The holding arm 54 is, as a result, mounted on the holder 20 so that it can be swivelled out to the right-hand side from the holder 20; it can be swivelled out so far that its semi-circular front region completes the receptacle 52 for the drink container to form a full cylinder.

The swivel-out movement of the holding arm 54 is caused by a helical torsion spring not shown in the drawing. When the holder 20 is pushed into its basic position in the housing 12, the holding arm 54 is pressed into the holder 20 by a right-hand side wall of the housing 12 so that it does not protrude laterally beyond the holder 20.

For the purpose of adapting to drink containers having various diameters, the holding device 10 according to the invention has a compensating flap 60, which is mounted on the holder 20 in a swivellable manner and is pressed into the interior of the receptacle 52 by a helical torsion spring 62.

It will be understood that each of the elements described above, or two or more together, may also find a useful application in other types of constructions differing from the types described above.

While the invention has been illustrated and described as embodied in holding device for drink containers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A holding device for drink container to be arranged in a central console of a car in front of a gear-changing or gear-selecting lever, the holding device comprising a holder having a linear guide and extendable from a pushed-in basic position into an extended holding position, said holder having a receptacle for insertion of a drink container, said linear guide being formed so that it causes a swivelling movement of said holder to a side guide during an extending movement of said holder from said pushed-in basic position extended holding position, said linear guide being formed so that it causes a swivelling movement of said holder downwards during the extending movement.

2. A holding device as defined in claim 1, wherein for an insertion of a drink containers, said receptacle has a holding arm arranged on said holder so that it can be moved outwards to a side and which, together with said holder, grips around a drink container inserted in said receptacle.

3. A holding device as defined in claim 2, wherein said holding arm is formed so that it can be moved outwards from said holder to a side to which said holder swivels during extension into said holding position.

4. A holding device as defined in claim 1, wherein said linear guide includes a stationary guide track extending at an angle to a direction of the extending movement of said holder, and a guide element provided on said holder and engaging in said stationary guide track.

5. A holding device as defined in claim 1, wherein said linear guide has a guide track extending at an angle to a direction of the extending movement of said holder, and a stationary guide element engaging in said guide track.

6. A holding device as defined in claim 1, and further comprising spring means cooperating with said holder so as to extend said holder into said extended holding position.

7. A holding device as defined in claim 1, wherein said holder is formed so that it is narrower than a diameter of the drink containers insertable into said receptacle of said holder.

8. A holding device for drink container to be arranged in a central console of a car in front of a gear-changing or gear-selecting lever, the holding device comprising a holder having a linear guide and extendable from a pushed-in basic position into an extended holding position, said holder having a receptacle for insertion of a drink container, said linear guide being formed so that it causes a swivelling movement of said holder to a side guide during an extending movement of said holder from said pushed-in basic position extended holding position, said linear guide being formed as a three-point guide.

* * * * *